(12) United States Patent
Krioukov et al.

(10) Patent No.: US 10,812,365 B2
(45) Date of Patent: Oct. 20, 2020

(54) GEOHYPERBOLIC ROUTING AND ADDRESSING SCHEMES FOR NETWORKS

(71) Applicant: Northeastern University, Boston, MA (US)

(72) Inventors: Dmitri Krioukov, Sharon, MA (US); Ivan Voitalov, Brookline, MA (US)

(73) Assignee: Northeastern University, Boston, MA (US)

( * ) Notice: Subject to any disclaimer, the term of this patent is extended or adjusted under 35 U.S.C. 154(b) by 39 days.

(21) Appl. No.: 15/814,795

(22) Filed: Nov. 16, 2017

(65) Prior Publication Data
US 2018/0248783 A1    Aug. 30, 2018

Related U.S. Application Data

(60) Provisional application No. 62/464,528, filed on Feb. 28, 2017.

(51) Int. Cl.
| | | |
|---|---|---|
| *H04L 29/12* | (2006.01) | |
| *H04L 12/24* | (2006.01) | |
| *H04L 29/08* | (2006.01) | |
| *H04L 12/751* | (2013.01) | |
| *H04W 40/20* | (2009.01) | |

(Continued)

(52) U.S. Cl.
CPC ............. *H04L 45/02* (2013.01); *H04L 41/12* (2013.01); *H04L 41/145* (2013.01); *H04L 61/20* (2013.01); *H04L 61/609* (2013.01); *H04L 67/1072* (2013.01); *H04W 40/20* (2013.01); *H04L 45/122* (2013.01); *H04L 45/126* (2013.01);

(Continued)

(58) Field of Classification Search
None
See application file for complete search history.

(56) References Cited

U.S. PATENT DOCUMENTS

| | | | |
|---|---|---|---|
| 6,266,704 B1 | 7/2001 | Reed et al. | |
| 8,284,788 B2 | 10/2012 | Westphal et al. | |

(Continued)

OTHER PUBLICATIONS

Papadopoulos, et al., "Greedy Forwarding in Dynamic Scale-Free Networks Embedded in Hyperbolic Metric Spaces", arXiv: 0805,1266v3, Sep. 10, 2010 (Year: 2010).*

(Continued)

*Primary Examiner* — Ruihua Zhang
(74) *Attorney, Agent, or Firm* — Hamilton, Brook, Smith & Reynolds, P.C.

(57) ABSTRACT

Network architectures and methods including addressing and dynamic network topology construction schemes that guarantee maximally efficient and scalable routing are disclosed herein. The network architectures and methods introduce a new approach to network design. The network architectures and methods include an addressing scheme based on geographic position of network nodes, and a network topology construction scheme based on the addressing scheme and that can reproduce properties of the existing Internet topology. A routing algorithm for the network architecture is shown to be maximally scalable and efficient. According to an example embodiment, a network includes a plurality of nodes, where each node has a network address based on a latitude of a location of the node, a longitude of the location of the node, and a centrality of the location of the node.

20 Claims, 8 Drawing Sheets

(51) Int. Cl.
*H04L 12/733* (2013.01)
*H04W 40/24* (2009.01)
(52) U.S. Cl.
CPC ........ *H04W 40/246* (2013.01); *H04W 40/248* (2013.01)

(56) References Cited

U.S. PATENT DOCUMENTS

2008/0008179 A1* 1/2008 Chen ................. H04L 61/2007
  370/392
2008/0244046 A1* 10/2008 Campbell ............... H04W 4/02
  709/222

OTHER PUBLICATIONS

A. Betker, I. Gamrath, D. Kosiankowski, C. Lange, H. Lehmann, F. Pfeuffer, F. Simon, and A.Werner. Comprehensive Topology and Traffic Model of a Nationwide Telecommunication Network. OCN, 6(11):1038-1047, 2014.
M. Boguñá, D. Krioukov, and K. C. Claffy. Navigability of Complex Networks. Nat. Phys., 5(1):74-80, 2009.
M. Boguñá, F. Papadopoulos, and D. Krioukov. Sustaining the Internet with Hyperbolic Mapping. Nat. Com., 1:62, 2010.
K. Bringmann, R. Keusch, and J. Lengler. Sampling Geometric Inhomogeneous Random Graphs in Linear Time. 2015. arXiv:1511.00576.
K. Bringmann, R. Keusch, J. Lengler, Y. Maus, and A. Molla. Greedy Routing and the Algorithmic Small-World Phenomenom. In PODC, 2017. arXiv:1612.05539.
C. Cassagnes, T. Tiendrebeogo, D. Bromberg, and D. Magoni. Overlay Addressing and Routing System Based on Hyperbolic Geometry. In ISCC, 2011.
B. Chun, D. Culler, T. Roscoe, A. Bavier, L. Peterson, M.Wawrzoniak, and M. Bowman. Planetlab: an Overlay Testbed for Broad-coverage Services. CCR, 33(3):3-12, 2003.
A. Cvetkovski and M. Crovella. Hyperbolic Embedding and Routing for Dynamic Graphs. In INFOCOM, pp. 1647-1655, 2009.
A. Dhumane, R. Prasad, and J. Prasad. Routing Issues in Internet of Things: A Survey. In IMECS, vol. 1, pp. 16-18, 2016.
X. Gabaix. Zipf's Law for Cities: an Explanation. Q. J. Econ., pp. 739-767, 1999.

B. Huffaker, M. Fomenkov, D. J. Plummer, D. Moore, et al. Distance Metrics in the Internet. In ITS, 2002.
B. Karp and H. T. Kung. Greedy Perimeter Stateless Routing for Wireless Networks. In MobiCom, 2000.
S. Kaune, K. Pussep, C. Leng, A. Kovacevic, G. Tyson, and R. Steinmetz. Modelling the Internet Delay Space Based on Geographical Locations. In PDP, pp. 301-310, 2009.
R. Kleinberg. Geographic Routing Using Hyperbolic Space. In INFOCOM, 2007.
D. Krioukov, F. Papadopoulos, M. Kitsak, A. Vandat, and M. Boguñá. Hyperbolic Geometry of Complex Networks. Phys. Rev. E, 82(3):036106, 2010.
A. Lakhina, J.W. Byers, M. Crovella, and I. Matta. On the Geographic Location of Internet Resources. JSAC, 21(6):934-948, 2003.
R. Landa, J. T. Araújo, R. G. Clegg, E. Mykoniati, D. Griffin, and M. Rio. The Large-scale Geography of Internet Round Trip Times. In Networking, pp. 1-9, 2013.
V. Lehman, A. Gawande, R. Aldecoa, D. Krioukov, B. Zhang, L. Zhang, and L.Wang. An Experimental Investigation of Hyperbolic Routing with a Smart Forwarding Plane in NDN. In IWQoS, 2016.
D. Magoni and C. Cassagnes. Dynamic Greedy Routing in Overlay Networks Using Virtual Coordinates from the Hyperbolic Plane. ETT, 2015.
C. H. Papadimitriou and D. Ratajczak. On a conjecture related to geometric routing. Theor. Comput. Sci., 344(1):3-14, 2005.
F. Papadopoulos, R. Aldecoa, and D. Krioukov. Network Geometry Inference Using Common Neighbors. Phys. Rev. E, 92(2):022807, 2015.
F. Papadopoulos, M. Kitsak, M. Á. Serrano, M. Boguñá, and D. Krioukov. Popularity Versus Similarity in Growing Networks. Nature, 489(7417):537-540, 2012.
F. Papadopoulos, D. Krioukov, M. Boguñá, and A. Vandat. Greedy Forwarding in Dynamic Scale-Free Networks Embedded in Hyperbolic Metric Spaces. In INFOCOM, 2010.
F. Papadopoulos, C. Psomas, and D. Krioukov. Network Mapping by Replaying Hyperbolic Growth. ToN, 23(1):198-211, 2015.
K.Varadhan, R.Govindan, and D. Estrin. PersistentRoute Oscillations in Inter-Domain Routing. Com. Net., 32(1):1-16, 2000.
M. von Looz, M. S. Ozdayi, S. Laue, and H. Meyerhenke. Generating massive complex networks with hyperbolic geometry faster in practice. In HPEC, 2016.

* cited by examiner

GEOHYPERBOLIC ROUTING AND ADDRESSING SCHEMES FOR NETWORKS

RELATED APPLICATION

This application claims the benefit of U.S. Provisional Application No. 62/464,528, filed on Feb. 28, 2017. The entire teachings of the above application are incorporated herein by reference.

BACKGROUND

The ongoing surge in the widespread usage of Internet services, coupled with the global adoption of mobile handheld devices, such as smartphones, with new Internet technologies and application scenarios, are putting a strain on existing Internet architecture. The existing Internet routing architecture is known to suffer from suboptimal routing scalability. The sizes of Forwarding Information Base (FIB) routing tables, and protocol overhead (number of routing update/control messages per topology change) of traditional routing protocols grow linearly or worse (superlinearly) with increase in network size. Moreover, fast-evolving data-centric application paradigms, such as the Internet of Things (IoT), require many orders of magnitude larger addressing spaces, where each "Internet thing" (a device or a chunk of data in a highly dynamic network) may require an address in a global addressing space. This makes the use of existing network models and routing protocols in the new Internet unfeasible due to the fact that there cannot exist any routing protocol that would scale sublinearly with the network size and that would operate correctly in any dynamic network. Yet this result does not mean that much more scalable routing cannot be developed for specific, Internet-like dynamic topologies. Therefore, essentially infinite routing scalability that the new Internet calls for to accommodate for the growing demand of application-driven paradigms such as IoT, would benefit from the development of new models of Internet topology and related dynamics that would allow for such scalable routing to operate efficiently and correctly.

SUMMARY

Disclosed herein are network architectures and methods that include an addressing scheme based on geographic position of network nodes. Nodes refer to physical routers, or equivalent network hardware, and physical connections (links) between the routers form a network. The network architectures and methods establish a network topology construction scheme based on the addressing scheme and that can reproduce properties of the existing Internet topology. They also can be used with efficient greedy geometric routing algorithms based on the topology and addressing schemes.

One example embodiment is a network that includes a plurality of nodes, where each node has a network address based on a latitude of a location of the node, a longitude of the location of the node, and a centrality of the location of the node.

Another example embodiment is a method of assigning a network address to a node in a network. According to the method, a latitude and longitude of a location of the node and centrality of the location of the node are determined. A network address is generated based on the latitude, longitude, and centrality of the location of the node and assigned to the node.

Another example embodiment is a computer-readable data storage medium having computer-readable program codes embodied therein for assigning a network address to a node in a network. The computer-readable data storage medium program codes include instructions that, when executed by a processor, cause the processor to determine a latitude and longitude of a location of the node, determine centrality of the location of the node, generate a network address based on the latitude, longitude, and centrality of the location of the node, and assign the network address to the node.

The network address of a node may be based on the latitude and longitude of the location of the node mapped to angular coordinates in 3-dimensional hyperbolic space. In some embodiments, the centrality of a node can be determined based on a rank of a zone in which the node is located. The rank can be based on values of a characteristic of a plurality of zones, such as, for example, population density, in which case the rank of the zone can be based on a decreasing order of population density. In some embodiments, the centrality of a node can be determined by designating a plurality of regions in the network, designating a plurality of zones within each region, ranking at least a subset of zones within each region based on values of a characteristic of the plurality of zones, and determining the centrality for the node based on the rank of the zone within which the node is located. If a new node is added to the network, the new node may be connected to a plurality of nodes that are closest to the new node based on hyperbolic distances determined from the network addresses of the new node and the plurality of nodes. In some embodiments, routing a packet at a given node in the network to a destination node in the network can include forwarding the packet to a next node that is directly connected to the given node and that is closest in hyperbolic distance to the destination node based on the network addresses of the next node and the destination node.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
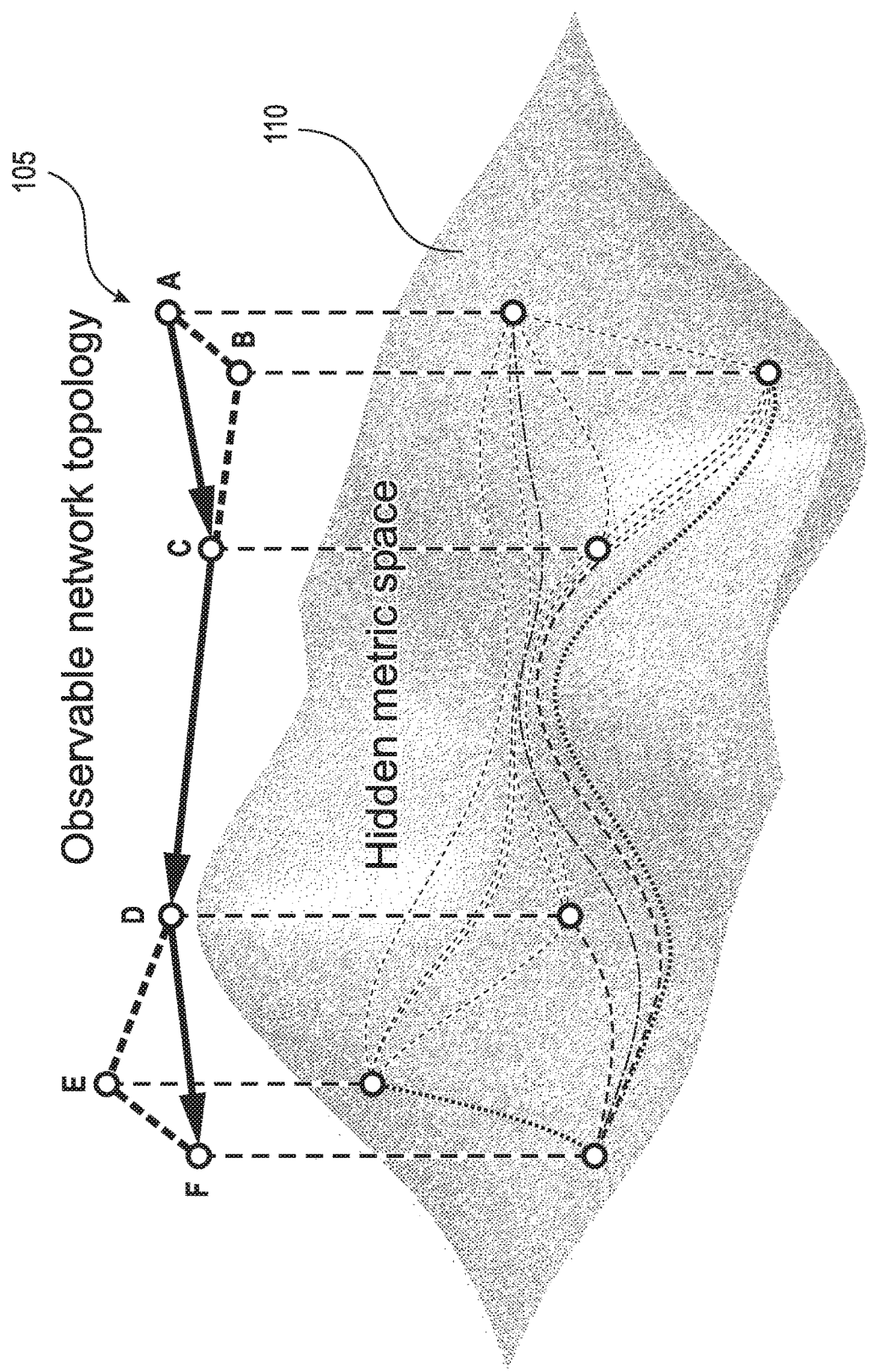
FIG. 1 illustrates an example of mapping a small network of nodes to an arbitrary underlying metric space, according to an example embodiment.

A description of example embodiments follows.

The disclosed network architectures include addressing schemes and dynamic network topology construction schemes that guarantee maximally efficient and scalable routing. The network architectures can solve the problems described above, and introduce a new approach to network design. First, the network architectures present an addressing scheme that is based on geographic position of network nodes. Second, the network architectures establish a network topology construction/design scheme based on the addressing scheme that can reproduce properties of the existing Internet topology. Third, the network architectures can be used with an efficient routing algorithm for the topology and addressing schemes, which is shown to be maximally scalable and efficient.

Greedy Geometric Routing

An aspect of the network architecture disclosed herein is greedy geometric routing (GGR), a routing scheme in which each network node is assigned a set of coordinates in a metric space and forwards information packets based on local information. A greedy algorithm forwards information packets to the node's neighbor that is geometrically closer to the destination node. To evaluate greedy geometric forwarding efficiency, the following characteristics can be used:

Success Ratio (SR): a percentage of source-destination node pairs that can successfully communicate using greedy forwarding.

Delay Stretch (DS): a ratio of the time delay accumulated along the greedy routing path to the time delay along the optimal shortest path calculated by Dijkstra's algorithm with link weight representing time delay. If the presented network design is applied to the overlay networks, where the overlay network topology is not the same as the underlay network topology, both overlay and underlay delay stretches must be considered.

Overlay Delay Stretch (ODS): a ratio between greedy-forwarding path delay and the optimal overlay topology path delay.

Underlay Delay Stretch (UDS): a ratio between greedy-forwarding path delay and the optimal underlay topology path delay.

Routing Scalability

Besides possessing the high-performance routing characteristics considered above, a practically viable routing scheme should be maximally scalable. Routing architecture scalability is mainly characterized by two parameters: (1) the size of the forwarding information base (FIB) as a function of the network size and (2) the number of routing control messages per topology change as a function of the network size. The former usually scales roughly linearly with the network size in traditional routing schemes (e.g., such as link state, distance vector or path vector) because every router has to store in its FIB the majority of possible destination nodes to guarantee successful forwarding. The latter scales either polynomially or worse depending on the specific routing protocol in use because each topology change (e.g., node/link removal or new node arrival) affects network paths, so the have to be updated accordingly for all nodes. An ideal routing scheme may assign to each node a minimal FIB of the size of number of neighbors and have zero or near-zero routing overhead (number of control messages per topology change). Remarkably, networks embedded in hyperbolic spaces can be equipped with such a scheme.

Hyperbolic Geometry of Networks

Internet-like networks, including the inter-domain Internet topology itself, exhibit many structural similarities with synthetic networks generated using hyperbolic spaces. One similarity is hierarchical tree-like organization, from which all other structural similarities follow, including sparsity, degree distributions, correlations, clustering, and so on.

To model evolution of the Internet and Internet-like networks, we developed a growing hyperbolic model (GHM). In this model, nodes arrive one at a time, are placed at certain locations in a hyperbolic space upon arrival, and are then connected to all previously added nodes with certain probabilities that are decreasing functions of the hyperbolic distance between new and existing nodes, and of network parameters including average connectivity, clustering, and the shape of the degree distribution. This model reproduces the Internet and other real Internet-like networks across a long list of network structural and dynamical properties. It also puts down a foundation for the maximum-likelihood-estimation-based (MT E) embedding algorithms that allows mapping of a given real network, including the Internet, to its latent hyperbolic space, by computing the hyperbolic coordinates of all nodes in the network. GHM and corresponding MLE-based embedding algorithms enable investigation of remarkable similarities between the Internet and hyperbolic graphs. Such similarities may be used to develop a fundamentally different routing scheme that is able to solve routing scalability and robustness problems with the current Internet.

Greedy Hyperbolic Routing

A network topology can be embedded into the hyperbolic space such that greedy hyperbolic routing (GHR) never fails to forward packets carrying information from any source to any destination because geodesic paths in the underlying hyperbolic space are congruent with (exhibit a small tightly bounded stretch with respect to) the shortest paths in the network.

Although such a scheme can ensure 100% SR, it is not optimal for mapping dynamic networks since it has to be recomputed from scratch for every topology change. However, the network design disclosed herein guarantees robustness of the greedy routing strategy. Even if the network connectivity changes significantly (e.g., due to link or node failures), greedy routing still finds, with high probability, alternative paths to target nodes due to there being many such paths in Internet-like networks and that they all are close to their corresponding geodesics in the underlying hyperbolic space.

Therefore, there is no need for topology update messages, and routing overhead is reduced to zero or near-zero, compared to its superlinear scaling in traditional routing. Moreover, because greedy routing does not have to store in FIBs any per-destination state, the FIB sizes are reduced to the number of directly connected neighbors to store their adjacency and hyperbolic coordinate information. That is, FIB sizes are also reduced to their theoretical minimum.

However, severe network connectivity failures can break the links or nodes that are crucial for greedy forwarding. In this case, GHR can experience local minima for some source-target pairs, when the packet circulates in a loop of nodes that do not have any neighbors closer to the target than themselves. Consequently, routing SR drops down and some auxiliary forwarding algorithms are needed to explore optimal routes and avoid packet drops. Such algorithms introduce routing overhead, so in order to keep overhead close to zero, the network routing design should be robust to connectivity failures. In particular, if a routing algorithm possesses a high SR under severe connectivity changes, only a small portion of source-target paths are affected; hence, an auxiliary forwarding algorithm introduces only small routing overhead and does not affect global routing scalability.

Network Topology Vs. GHR Efficiency

The network design disclosed herein can generate networks with any strength of clustering (from strongest to zero) and with power-law distributions $P(k) \sim k^{-2}$ of node degrees k, for example. We have found that these two network topology parameters affect the efficiency of GHR in terms of success ratio, routing stretch, and their robustness with respect to network damage. Specifically, the efficiency and robustness of GHR are maximized if γ is equal to 2, and if clustering is strongest. Remarkably, the real Internet topology has almost exactly the same values of γ and clustering, needed to maximize the efficiency of GHR. Our network design technology ensures that the resulting networks have these maximally optimal parameters to provide maximum stability and efficiency of GHR.

Geographic Distance and Time Delay

Network time delay, i.e., time interval between source node sending a packet and receiving a response from a target node, has a direct effect on network user experience. Therefore, it is important to include some notion of time delay in the network design. Research has shown that packet round-trip-time (RTT) is, on average, linearly correlated to the geographic distance between nodes in the Internet, which suggests that an addressing scheme incorporating the geographic location of each node may lead to the node-to-node distances assignment that can closely approximate network delays.

Geographic Addressing Scheme

Based on the requirement of the network to minimize the time delay between a pair of nodes and given that the delay is, on average, linearly related to the geographic distance, the following describes the geographic addressing scheme (GEO). It is used as the simplest reference model to show the minimal geolocation-based addressing scheme coupled to the network growth model and greedy geometric routing algorithm. Remarkably, in the case of GEO design, network growth (construction), addressing and routing schemes are based on local information only.

GEO network design includes the following steps:

1. Upon arrival into a network, a new node i gets an address $(\theta_i, \phi_i)$, determined from its geolocation:

$$\theta_i = \frac{\pi}{2} - \text{latitude}_i;$$

$\phi_i$=longitude$_i$, if longitude$_i \geq 0$; otherwise, $\phi_i = 2\pi - |\text{longitude}_i|$ 2. Using addresses of previously added nodes $(\theta_j, \phi_j)$, where j=1, 2, . . . (i−1), geographic (great circle) distances $d_{ij}$ between nodes i, j are calculated as follows:

$$d_{ij} = R_E \cos^{-1}(\cos \theta_i \cos \theta_j + \sin \theta_i \sin \theta_j \cos(\phi_i - \phi_j)) \quad \text{Eq. (1)}$$

Here $R_E$=6371 km is the radius of the Earth.

3. Based on the distances $d_{ij}$, node i is connected to m geographically closest neighbors.

4. Greedy geometric routing is performed using the distances given by Eq. (1).

The advantage of this scheme is that every link is established with the geographically closest neighbors only, so that routing from one node to another accumulates the lowest geographic distance and the lowest delay. However, when applied to worldwide network deployments, this scheme can create networks with topologies resembling random geometric graphs on a two-dimensional sphere $\mathbb{S}^2$ that are not scale-free and, thus, less robust to random link and node failures. Therefore, this model has low SR for the greedy geographic routing, and its delay stretch degrades quickly with the network size. Networks constructed via GEO scheme require a significant amount of auxiliary topology update messages to correct navigation of packets, making routing overhead high, which suggests the need for another, more advanced addressing scheme that overcomes these issues.

Description of Network Architecture

Disclosed herein are network architecture and methods that use nodes' geographical positions for addressing, generate networks structurally similar to the current Internet, support maximally scalable and efficient routing scheme, and account for topology dynamics and the nodes' mobility. Such network design can be applied to, for example, any telecommunication network construction, traditional routing infrastructure networks, mobility networks, Internet of Things (IoT) networks, and overlay (peer-to-peer/P2P) networks.

An aspect of the disclosed network architecture is the mapping of network nodes to an underlying metric space. Specifically, the network is mapped to a 3-dimensional hyperbolic space $\mathbb{H}^3$ such that each node i is characterized by three coordinates $(r_i, \theta_i, \phi_i)$ that constitute a node's address. Geographic location of node i is given by its latitude and longitude that are mapped to two corresponding angular (geographic) coordinates $\theta_i, \phi_i$. These locations are then "hyperbolized" by adding radial coordinate $r_i$, which accounts for the node's centrality in the network. To map all possible node sites to the $\mathbb{H}^3$ space, the geographic area of interest for network deployment, e.g., the whole Earth surface, a continent, or a country, is tiled in multiple zones, and each of them is assigned a centrality score.

FIG. 1 illustrates an example mapping of a small network 105 consisting of nodes A, B, C, D, E, F to an arbitrary underlying metric space 110. Each node includes coordinates in the underlying metric space (shown the manifold 110 in FIG. 1). Distances between nodes in the manifold 110 are shown as lines on the manifold 110. When greedy geometric routing is performed from node A to node F, the node checks its distances to its neighbors B, C, and a target node F. In FIG. 1, distance C-F is smaller than B-F, therefore, node A forwards a packet to node C. Node C performs similar calculations and selects node D as the next hop, which is directly connected to the target node F. The total path is then A-C-D-F.

To ensure maximal efficiency of the greedy routing algorithm, nodes' degrees can be distributed as a power-law with exponent 2. To achieve this, the centrality score $s_z$ of each zone z can be mapped to z's centrality rank $t_z$, which is z's rank in the list of zones sorted in the decreasing order of their centrality scores. This rank can be used then to assign a radial (centrality) coordinate of zone z. Hence, if a node appears at any geolocation within the area properly tiled in such zones, it is immediately assigned three coordinates that map a node to the $\mathbb{H}^3$ space. A network is constructed by connecting a new node torn hyperbolically closest nodes. Remarkably, a greedy hyperbolic routing algorithm can be applied on such a network without any modifications upon topology changes or new node arrivals because no update messages need to be exchanged and no global changes to FIBs need to be performed.

Technical Description

Zone Centrality Calculation Scheme

Centrality scores can be assigned to any location within the geographic area of interest as follows:

1. Tessellate the geographic area where the network is to be deployed into Q zones such that centrality scores of zones $s_1 \ldots s_Q$.
2. For each zone z, assign its centrality rank $t_z$ that is z's rank in the list of zones sorted in the decreasing order of their centrality scores $s_1 \ldots s_Q$.
3. Nodes appearing within zone z are assigned corresponding radial coordinate.

$$r_z = \ln(\xi + t_z) \quad \text{Eq. (2)}$$

Here $\xi \geq 0$ is a parameter defining minimum possible radius. Note that for the zone with the largest centrality score and $\xi = 0$ the radius is set to 0.

Figure 2:
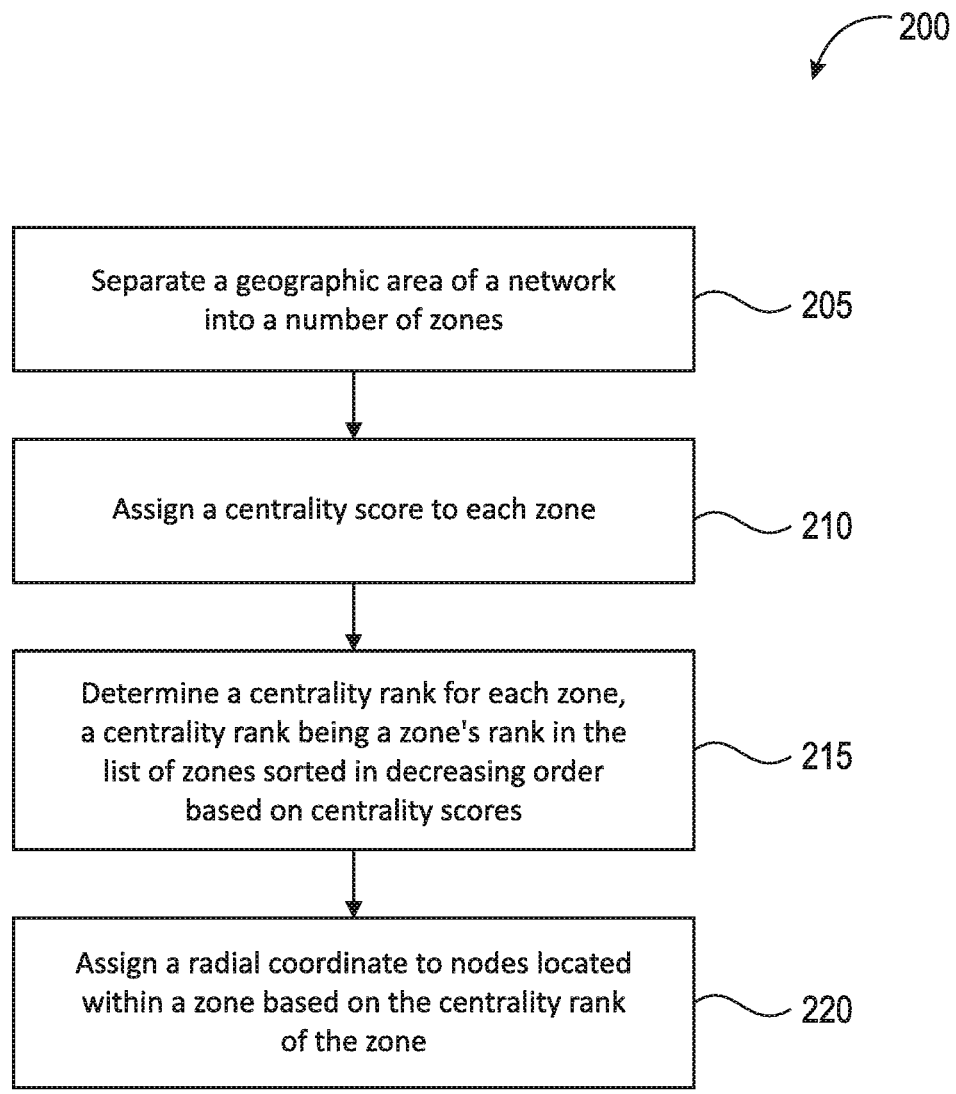
FIG. 2 is a flow chart illustrating determining centrality scores, according to an example embodiment.

FIG. 2 illustrates determining centrality scores, according to an example embodiment 200. According to the example 200, a geographic area of a network is separated 205 into a number of zones. A centrality score is assigned 210 to each zone, and a centrality rank for each zone is determined 215, a centrality rank being a zone's rank in the list of zones sorted in decreasing order based on the zones' centrality scores. Nodes located within a zone are assigned 220 a radial coordinate based on the centrality rank of the zone.

Node Addressing Scheme

Given the geographic area tessellation used for centrality scores calculation and the geographic location of network node i, an address $(r_i, \theta_i, \phi_i)$ for the node can be assigned in the following manner:

1. Assign $$\theta_i = \frac{\pi}{2} - \text{latitude}_i$$

2. If $\text{longitude}_i \geq 0$, assign $\phi_i = \text{longitude}_i$; otherwise, $\phi_i = 2\pi - |\text{longitude}_i|$ 3. Using $(\theta_i, \phi_i)$, find a corresponding zone $z_i$ and centrality rank $t_{z_i}$ for the node.

4. Assign radial coordinate $r_i$ to the node.

Figure 3:
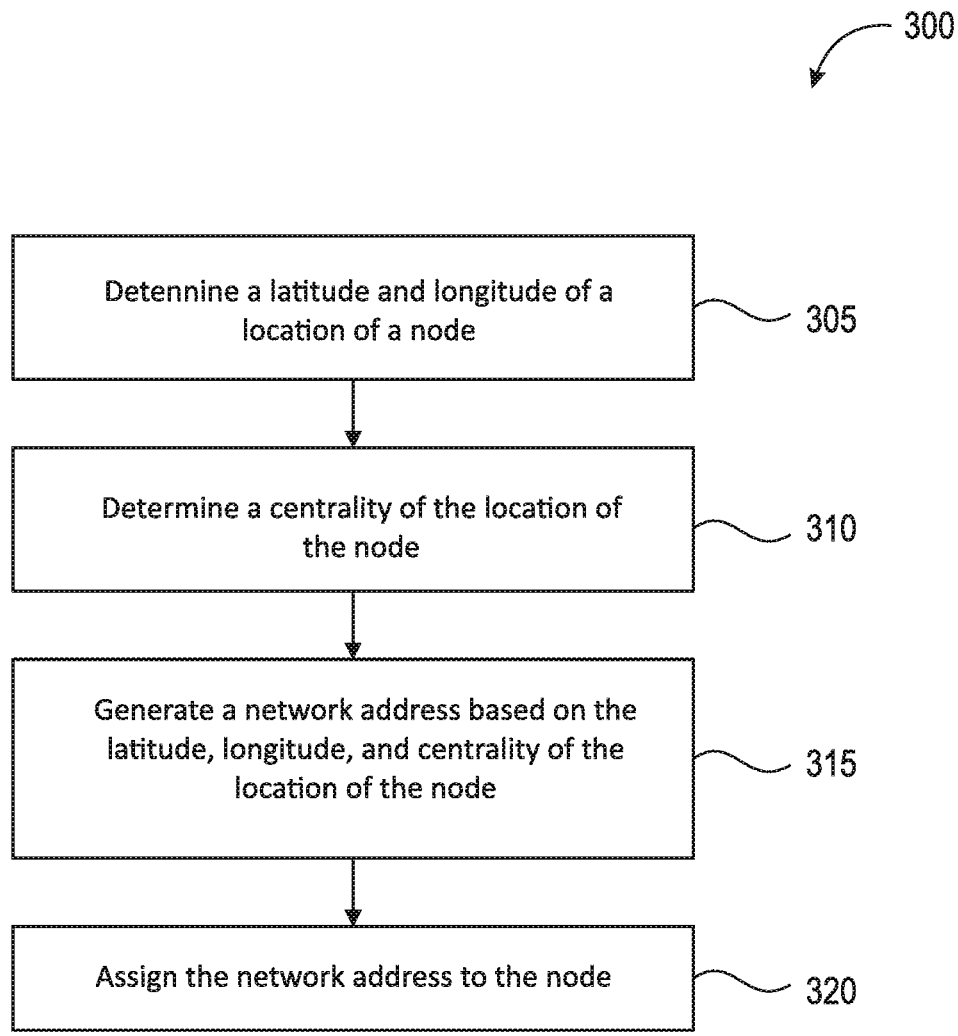
FIG. 3 is a flow chart illustrating assigning a network address to a node, according to an example embodiment.

FIG. 3 illustrates assigning a network address to a node, according to an example embodiment 300. According to the example 300, a latitude and longitude of a location of a node are determined 305. Determining the latitude and longitude may be accomplished by obtaining or referencing (e.g., looking-up) the latitude and longitude of the location of the node. A centrality of the location of the node is determined 310. A network address is generated 315 based on the latitude, longitude, and centrality of the location of the node and assigned 320 to the node. The example method 300 illustrated in FIG. 3 can be performed by a Network Management System (NMS), where the NMS determines information (e.g., latitude, longitude, centrality) and assigns network addresses to at least a portion of the nodes in the network. Alternatively, a node itself (or entity associated with the node) can perform the example method 300, where the node (or associated entity) determines information (e.g., latitude, longitude, centrality) regarding the location of the node and assigns a network addresses to the node.

Network Construction Scheme

Given the coordinates of nodes mapped to the geohyperbolic space obtained by the addressing scheme, the network can grow as follows:

1. A New node i is added to the network and is assigned its coordinates $(r_i, \theta_i, \phi_i)$.

2. Compute hyperbolic distances $d_{ij}$ for already existing nodes j using corresponding coordinates $(r_j, \theta_j, \phi_j)$ and Eq. (3):

$$d_{ij} = \cos h^{-1}[\cos h\, r_i \cos h\, r_j - \sin h\, r_i \sin h\, r_j \cos \Delta\theta_{ij}] \quad \text{Eq. (3)}$$

$$\Delta\theta_{ij} = \cos^{-1}[\cos \theta_i \cos \theta_j + \sin \theta_i \sin \theta_j \cos(\phi_i - \phi_j)] \quad \text{Eq. (4)}$$

Here, $\Delta\theta_{ij}$ is a great circle distance on two-dimensional sphere $\mathbb{S}^2$.

3. Find m hyperbolically closest nodes to the new node i, and connect i to all of those nodes.

Figure 4:
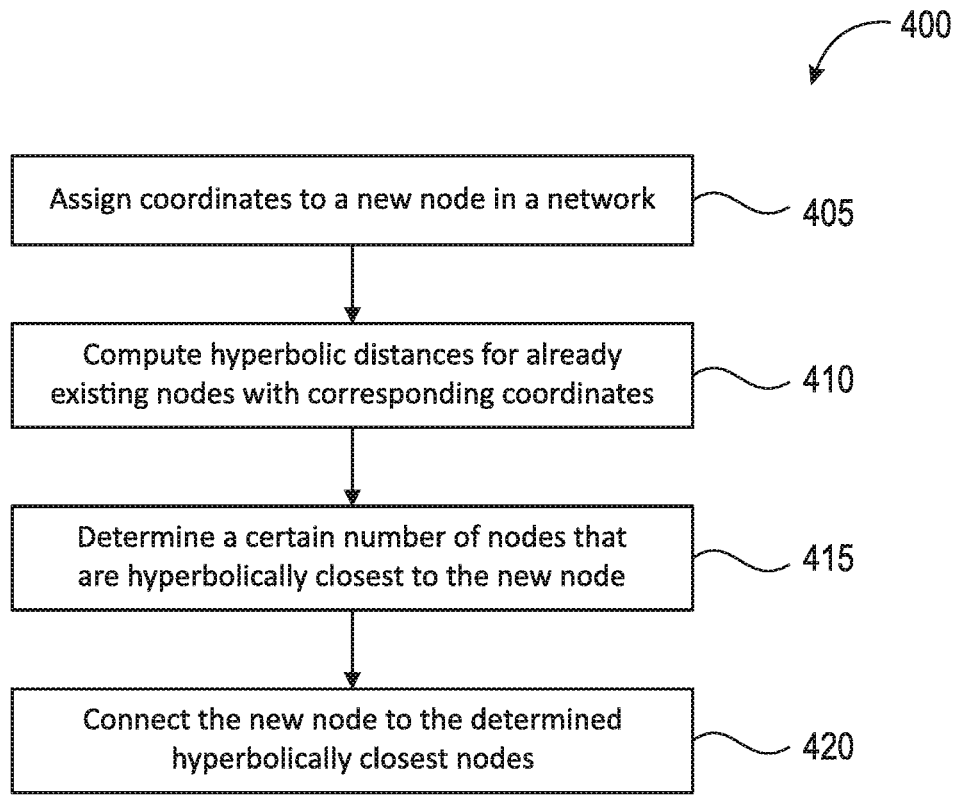
FIG. 4 is a flow chart illustrating adding a new node to a network, according to an example embodiment.

FIG. 4 illustrates adding a new node to a network, according to an example embodiment 400. According to the example 400, coordinates $(r_i, \theta_i, \phi_i)$ are assigned 405 to the new node in the network, and hyperbolic distances $d_{ij}$ are computed 410 for already existing nodes with corresponding coordinates $(r_j, \theta_j, \phi_j)$. A certain number of nodes that are hyperbolically closest to the new node are determined 415, and the new node is connected 420 to the determined hyperbolically closest nodes.

Routing Scheme

Figure 5:
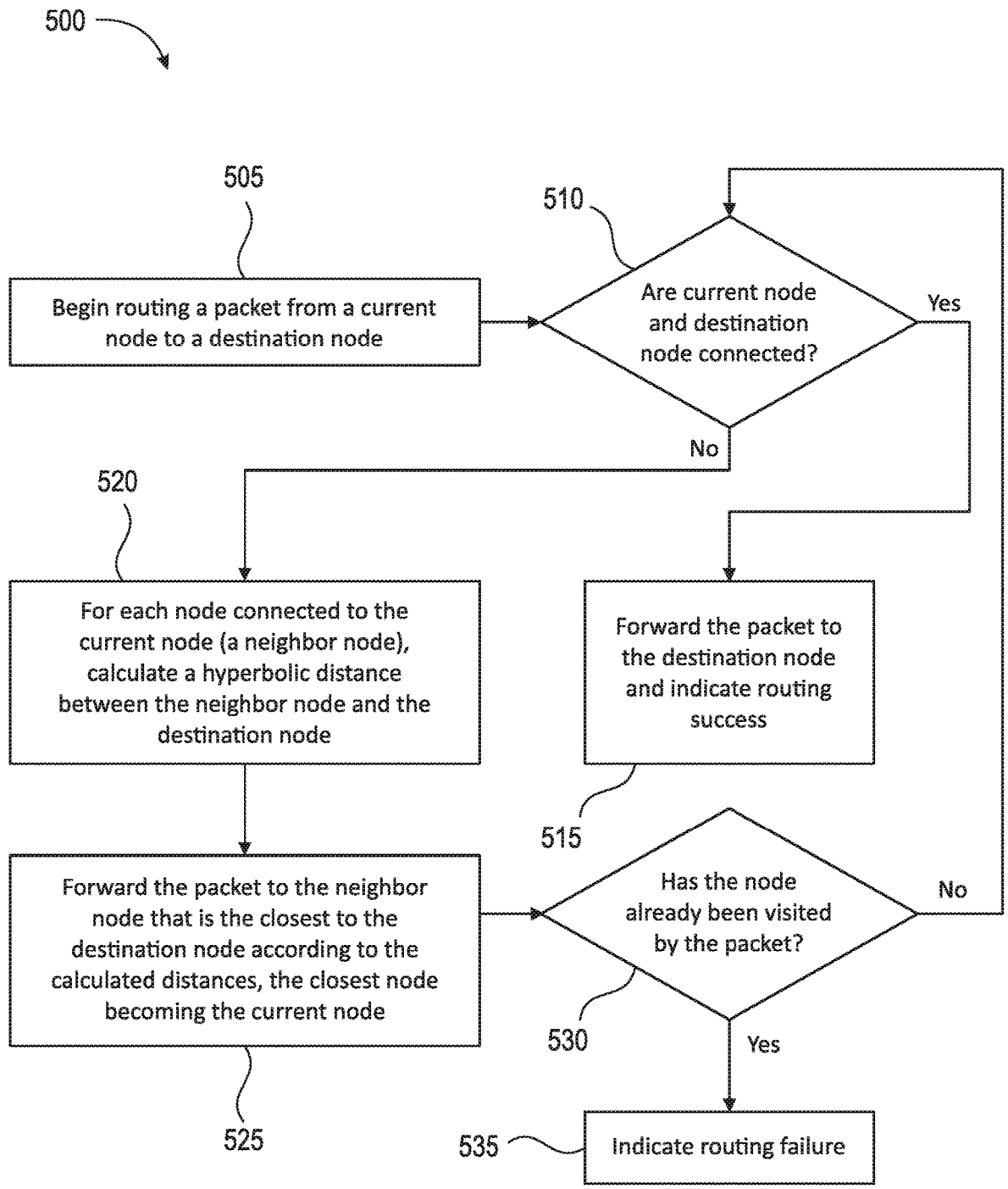
FIG. 5 is a flow chart illustrating greedy hyperbolic routing in a geohyperbolic space, according to an example embodiment.

Given the coordinates of the nodes mapped to the geohyperbolic space, greedy hyperbolic routing scheme can operate as follows (with reference to FIG. 5):

1. Choose source node s and target node t 505. If nodes s and t are directly connected 510, a packet is forwarded 515 directly to node t, signifying routing success.

2. If nodes s and t are not directly connected 510, iterate over the neighbors of node s and calculate 520 hyperbolic distances $d_{it}$ between neighbor i and node t using Eq. (3).

3. Forward 525 the packet to s's neighbor i* that is the closest node to the target node t across all neighbors i, according to distances $d_{it}$.

4. If node i* has been already visited by the packet 530, the algorithm stops, signifying routing failure 535.

5. Otherwise, node i* becomes a new source node and algorithm goes back to step 1 510.

Evaluation of Technology

This section describes an evaluation of the disclosed network design and provides an example implementation. We emulated the construction of a worldwide overlay network, i.e., a network deployed over the Earth's surface, in which nodes are placed in cities, and each city can have only one corresponding node. This simplification is done due to the availability of open source data and well-suited characteristics of city populations. We tested basic routing performance characteristics for three network design schemes: pure geographic (GEO), geohyperbolic (GH), and a refinement of the GH scheme—regionalized GH (RGH).

GHR Performance Metrics

To assess the performance of GHR in the simulated network, we used metrics defined above. Specifically, we measured success ratio (SR) and 50th and 95th percentiles of both underlay delay stretch (LIDS) and overlay delay stretch (ODS) since we emulated growth of an overlay network.

Node Appearance Order

To compare the three network designs, we assumed that nodes appear in the same order in all networks. Particularly, we sorted all possible (underlay) nodes by their centrality scores. Because nodes are mapped to their cities (zones) uniquely, centrality scores can be assigned directly to the nodes without mapping a node's geolocation to the corresponding zone. Starting from the most central node, nodes are added sequentially, one per each network time step t. Node i appears at network time $t_i = i$, and is assigned a centrality coordinate as:

$$r_i = \ln(t_i + \xi) \quad \text{Eq. (5)}$$

Here $\xi$ plays a role of a minimal network time, which sets minimal possible radial coordinate. We note that the larger this initial radial cutoff is, the less important the radial coordinate in defining the hyperbolic distance in Eq. (3), and the more important the angular (great circle) distance. Controlling the $\xi$ parameter, we are able to control the trade-off between "geographicity" and "hyperbolicity" of a resulting network, i.e., the preference of new nodes to connect to either more geographically closer or more central old nodes. The radial coordinate assignment in Eq. (5) produces the same shape of radial coordinate distribution $\rho(r)$, as in the scheme described above in the Zone Centrality Calculation Scheme section, giving rise to the same shape of node degree distribution P(k) in the resulting network.

It should be understood that this order-dependent radial coordinate assignment is applied for simulation purposes only. In real world applications, radial coordinates of nodes are not pre-assigned, but calculated upon a node's arrival according to the centrality score of the corresponding zone. The simulations have also shown that the order of node appearance does not matter at late stages of the network growth.

Centrality Measure

In simulations, we assumed that each city represents a zone and we choose city population as a centrality score of a zone. Because in the simulations we ordered nodes by corresponding centrality scores, the most central nodes (the most populated cities) that have smaller radial coordinates, appear first. See Eq. (5). Thus, reflecting the expectation that new nodes are more likely to appear first in more populated cities, where the user demand for network services is higher. This expectation is confirmed by real-world network data. For example, the number of autonomous systems (ASes) in the inter-domain Internet topology is correlated with the corresponding geolocation's population; the Internet traffic volume is also correlated with the population density of geolocations. We also note that city populations are distributed as a power-law with exponent close to 2, which happens to be exactly as required for the uniform node distribution in $\mathbb{H}^3$ space, and thus for maximizing the efficiency of GHR.

Regionalized GH Scheme

Also disclosed herein is a refined geohyperbolic addressing scheme to mitigate potential problems that may appear in worldwide network deployments constructed using a pure GH scheme. Both overlay and underlay stretches are measured in simulations to ensure high performance of greedy routing as a network grows. In that context we noted that the pure GH scheme, when applied to geographically large areas, may be somewhat suboptimal as far as delay stretches are concerned. Consider packet forwarding from Boston to Los Angeles, for example, and suppose that the most central node is located in Shanghai (due to the largest population). If a Shanghai node is placed very close to the center of $\mathbb{H}^3$ space, i.e. if its radius is close to zero, this node will attract the majority of packets due to its closeness to a vast majority of geodesic paths in $\mathbb{H}^3$. It may happen then that a packet would be forwarded from Boston to Shanghai first, and then from Shanghai to Los Angeles. This means that the packet would travel over a large geographic distance and, based on the fact that network delay is related to geographic distance, accumulate a large time delay.

To address this suboptimality, the whole geographic area of interest can be split into regions. These regions are not to be confused with smaller zones defined earlier. Within each region local hub nodes can then be established. These hub zones, from all the regions, may all be mapped close to the origin of $\mathbb{H}^3$, so that, a majority of geographically local paths are GGR-routed through them. If a packet from the above Boston to Los Angeles example could stay within the North America region, the overall time delay would be significantly reduced To establish local hubs, a region scheme of the Earth can be devised. In these simulations, we districted the Earth into the regions with approximately equal populations using administrative level 1 units (e.g., states in the USA) and their populations. Administrative level 1 units were merged together into bigger regions creating full coverage of the globe. If each region has approximately the same population, then, on average, the total application load on the nodes within each region would be the same, since traffic volumes are usually related to the geographic site population. In principle, different refinements to the region scheme can increase the performance of the resulting network, however, we find that even this simple regionalization method works well.

Given any collection of M regions, the GH scheme can be regionalized as follows. First, map all zones to their corresponding regions. Second, within each region, sort the zones belonging to the region in the decreasing order of their centrality scores, and pick the first $N_{hubs}$ zones from each list, where $N_{hubs}$ is a scheme parameter. This way, an ordered list $L_k = \{z_{1,k}, z_{2,k}, \ldots, z_{N_{Hubs},k}\}$ of zones $z_{i,k}$, i=1, 2, ..., $N_{hubs}$, is obtained for each region k=1, 2, ..., M. Each entry in this list corresponds to the 1st, 2nd, ..., $N_{hubs}$-th most central zone in each region. Third, the centrality rank $t_i$ of zones $z_{i,k}$ are set to i, i.e., $t_{z_{i,k}}=i$. For example, all the 2nd most central zones in every region get the same centrality rank t=2. Fourth, given thus computed centrality ranks of all hub zones, their radial coordinates are still computed using Eq. (2). This way, all the 2nd most central zones in every region get the same radial coordinate r=+2), while the angular coordinates are still determined by geographic coordinates. Therefore, regional hub zones in RGH become equally important across different regions, so that GGR favors geographically local hubs, thus reducing delays. The remaining zones z that do not appear in any of the hub lists $L_k$ are then sorted in the decreasing order of their centrality scores, and their centrality ranks are set to t=$N_{hubs}$+i, where i is z's rank in this sorted list of remaining zones. Their radial coordinates are still set using Eq. (2).

Such a RGH coordinate assignment scheme distorts slightly the radial coordinate distribution $\rho(r)$ from the purely exponential distribution in the GH scheme. However, only a small fraction of nodes $$\sim \frac{MN_{hubs}}{N}$$

is assigned radial coordinates differently than in the scheme. We have found in simulations that although GHR SR is slightly lower in the RGH scheme compared to the GH scheme, the fraction of large delay paths is noticeably lower in RGH, thus improving overall network user experience.

Figure 6:
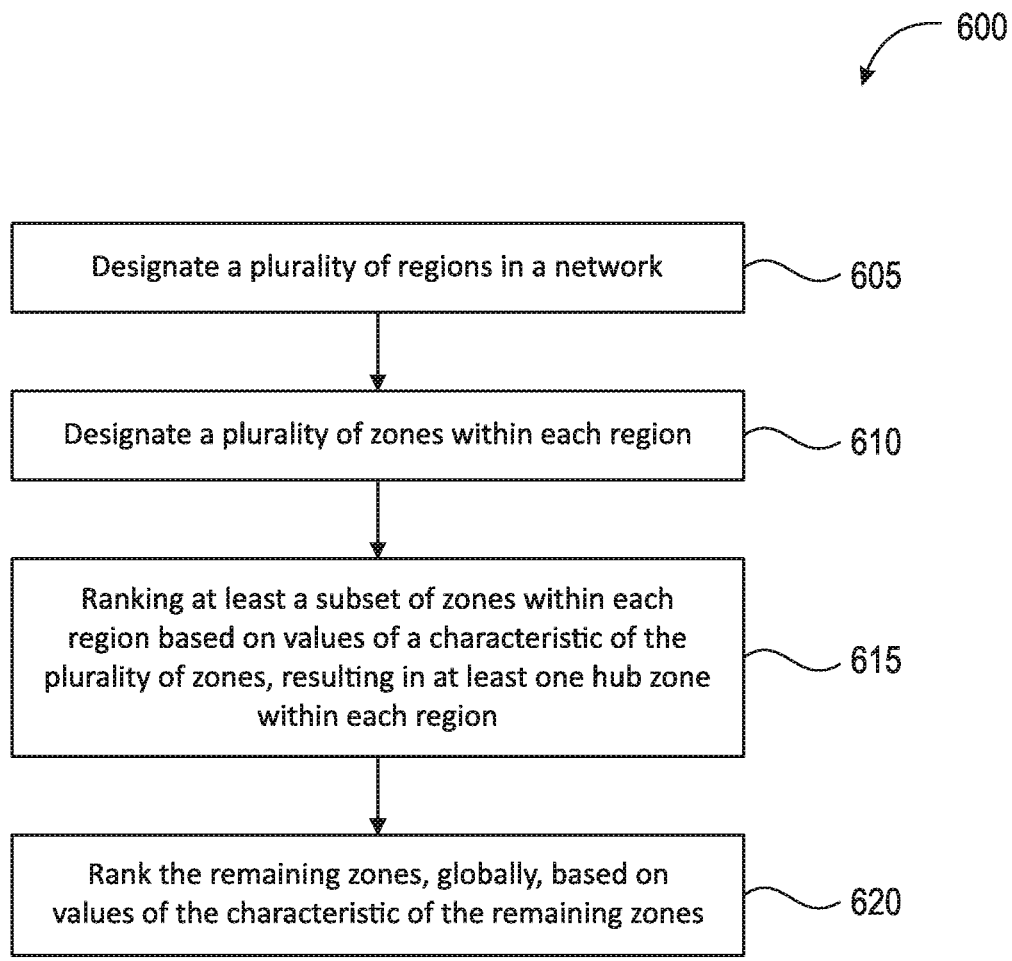
FIG. 6 is a flow chart illustrating determining centrality scores, according to an example embodiment.

FIG. 6 illustrates determining centrality scores, according to an example embodiment 600. According to the example 600, a plurality of regions in a network are designated 605, and a plurality of zones within each region are designated 610. At least a subset of zones within each region are ranked 615 based on values of a characteristic of the plurality of zones, resulting in at least one hub zone within each region.

The remaining zones are ranked 620, globally, based on values of the characteristic of the remaining zones.

Data

To evaluate the disclosed schemes, we used the following data. City data geographic positions and populations) obtained from the free GeoNames database, administrative level 1 units and their boundaries obtained from the free NaturalEarth database, and gridded population data obtained from SEDAC UN-adjusted population database. It should be understood that the network architecture and methods disclosed herein do not rely on these specific data sets; the example data are only used to demonstrate the features of the network designs and perform simulations.

Models Parameters

The following models parameters are used in the simulations:

- All models: for the number of connection each new node establishes, we set m=5. This is the minimal value of m that guarantees a nearly 100% SR in RGH scheme.
- GH: $t_0=5$. This parameter is chosen to ensure that there are no superhubs attracting the majority of new links due to small radial coordinates according to Eq. (5).
- RGH: $t_0=5$, M=14 and $N_{hubs}=5$. This choice of M allows the Earth to be divided into the regions with approximately 500 million people in each region. This division is optimal for the given number of local hubs.

Simulated Networks and NDN Testbed

Two types of networks were used for simulations. The first type is the real operational Named Data. Networking (NDN) testbed, in which its current topology is ignored, and built from scratch using three schemes—GEO, GH, RGH. The second type is generated via the same three schemes using all possible nodes (cities), totaling to ~112,000 populated sites with populations greater than 1,000 people available in the GeoNames database. For both sets, the node appearance order is as described above. These networks are built by adding nodes sequentially, starting from the most central one.

Routing efficiency characteristics were measured at certain time steps. The first time step when the measurements are performed is t=205, when all $N_{hubs}=5$ local hubs from all M=14 regions of the RGH scheme are added to the network. The last measurement is done at time t=10,000. In addition, at each measurement time, 20% of random links are removed to test the robustness of the schemes with respect to extreme catastrophic failures in the network, and the same measurements are then performed on these damaged networks.

To demonstrate stability of routing characteristics in the RGH scheme with respect to adding nodes in an order that does not exactly follow the centrality order, we performed the same measurement in Randomized RGH networks. Specifically, we placed the first N=205 nodes in a proper centrality-sorted order according to RGH scheme, i.e., starting from the most populated city up to the $205^{th}$ most populated city. After that point, new nodes were picked with probabilities proportional to the populations of their corresponding cities. This is done to mimic more closely a real-world situation, where the appearance order of nodes is not deterministic, but the probability of node appearance is still proportional to the number of potential overlay users. Catastrophic connectivity disruption tests were also performed in these randomized networks.

Connectivity Failures

To test robustness of the greedy routing scheme, the following connectivity failure tests were performed. First, 1-node/1-link removals were performed in the NDN testbed topology due to its small size. Specifically, 1 node or 1 link was removed, emulating node and link failures, and overall routing characteristics (SR, UDS, ODS) were measured. All the routing metrics changes were checked for all possible 1-node/1-link removals, and results averaged over all such trials. If 1-node/1-link removals do not strongly affect routing measurements even in this small topology, one would not expect such small network damage to be noticeable in larger topologies. Second, much more catastrophic connectivity disruptions were checked: both in NDN testbed and in simulated networks, 20% of all links are removed, and all the routing measurements performed again. In addition, due to the small size of NDN testbed topology, we performed 100 trials of 20% random link removal to sample the majority of failed network states. The results reported for NDN testbed were averaged over the 100 trials.

These tests were performed to check how much a greedy routing scheme suffers from connectivity failures, i.e., how many paths are effectively non-routable and should thus be addressed, if needed, using an alternative routing strategy. Overall, if routing SR stays close to 1, only a tiny fraction of routing paths needs to be corrected using auxiliary routing strategies, meaning that routing overhead is still close to zero in this case.

Delay Estimation

Link delays in the networks are needed to compute delay stretches. Because link delays in synthetic networks cannot be measured, we analyzed the delays of the current links in the NDN testbed and found that the correlation between the delays and the geographic great circle distances is given by $$\text{delay (ms)} \approx \frac{\text{distance (km)} + 1165}{49} \qquad \text{Eq. (6)}$$

We used this relation to estimate the shortest path delay in the underlay between any pair of nodes, or equivalently the delay of a direct overlay link between the two nodes (if it exists).

Results

Both GH and RGH showed excellent success ratio and delay stretches close to 1, nearly independent of the network size. In contrast, the GEO scheme degrades fairly quickly, thus becoming unfeasible to use in real networks. Both ODS and UDS $95^{th}$ percentile show that the regionalization scheme disclosed herein reduces the delay stretch in comparison to the non-regionalized GH scheme. Moreover, the results of the real-world-like scenario with randomized node appearance order shown by Randomized RGH are comparable to the results of the original RGH scheme. The 95th percentiles of both delay stretches are bounded with a network growth for GH, RGH, and Randomized RGH schemes. Importantly, connectivity failures do not affect the success ratio and delay stretches of the GH and RGH schemes, thus making them feasible schemes for the deployment in real networks.

In the experiments with the real NDN testbed, we measured the same characteristics. The results of these experiments are presented in Tables I-III. The SR in the original network is exactly 1 for the GH and RGH scheme, as well as for all 1-node/1-link failure networks, meaning that no topology update messages should be sent upon such failures. Even if 20% of random links fail, both schemes maintain success ratio close to optimal 1 (0.97-0.98). The small percentage of unsuccessful paths can be handled by alternative routing strategies, such as adaptive forwarding algorithms, without introducing any significant routing protocol overhead. The median overlay stretch is 1 in both the original and failed networks, meaning that greedy forwarding paths are delay-optimal even upon major changes in network topology.

TABLE I

Simulations for the NDN testbed GH model. 1-link/1-node removal, 20% of links removal tests and the original network characteristics.

| Scenario | SR | ODS 50$^{th}$ | ODS 95$^{th}$ | UDS 50$^{th}$ | UDS 95$^{th}$ |
|---|---|---|---|---|---|
| Original | 1.000 | 1.000 | 2.646 | 1.225 | 3.616 |
| 1-node | 1.000 | 1.000 | 2.655 | 1.230 | 3.725 |
| 1-link | 1.000 | 1.000 | 2.647 | 1.229 | 3.660 |
| 20% links | 0.977 | 1.000 | 2.931 | 1.309 | 4.511 |

TABLE II

Simulations for the NDN testbed RGH model. 1-link/1-node removal, 20% of links removal tests and the original network characteristics.

| Scenario | SR | ODS 50$^{th}$ | ODS 95$^{th}$ | UDS 50$^{th}$ | UDS 95$^{th}$ |
|---|---|---|---|---|---|
| Original | 1.000 | 1.000 | 1.544 | 1.216 | 2.187 |
| 1-node | 1.000 | 1.000 | 1.607 | 1.219 | 2.337 |
| 1-link | 1.000 | 1.000 | 1.578 | 1.219 | 2.209 |
| 20% links | 0.970 | 1.000 | 2.161 | 1.268 | 3.826 |

TABLE III

Simulations for the NDN testbed GEO model. 1-link/1-node removal, 20% of links removal tests and the original network characteristics.

| Scenario | SR | ODS 50$^{th}$ | ODS 95$^{th}$ | UDS 50$^{th}$ | UDS 95$^{th}$ |
|---|---|---|---|---|---|
| Original | 0.895 | 1.000 | 1.259 | 1.166 | 1.675 |
| 1-node | 0.893 | 1.000 | 1.263 | 1.166 | 1.682 |
| 1-link | 0.895 | 1.000 | 1.263 | 1.167 | 1.682 |
| 20% links | 0.879 | 1.000 | 1.392 | 1.248 | 1.974 |

Computer and Network Environment

Figure 7:
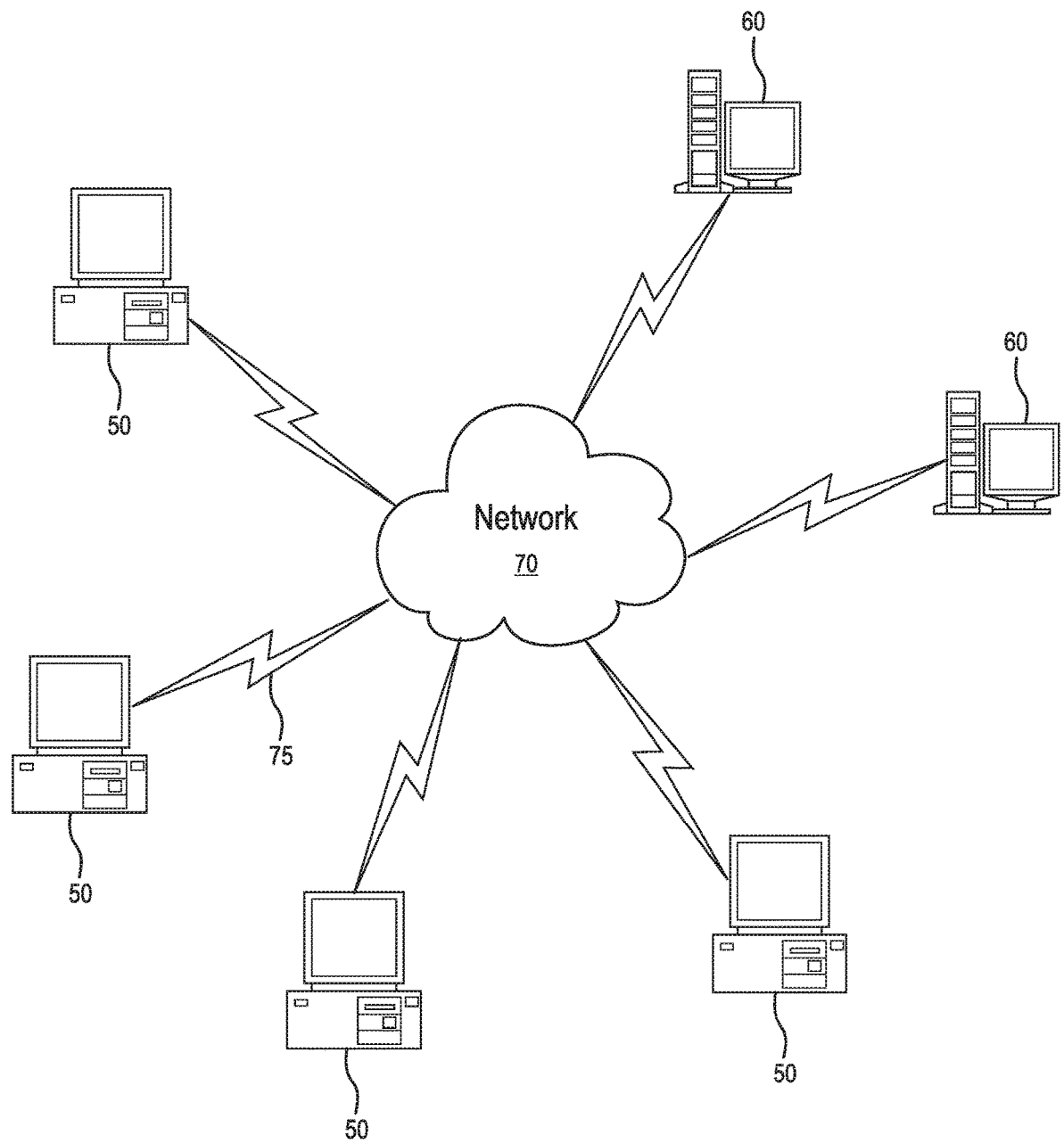
FIG. 7 is a schematic view of a computer network environment in which the example embodiments presented herein may be implemented.

FIG. 7 illustrates a computer network or similar digital processing environment in which the present embodiments may be implemented. Client computer(s)/devices/processors 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a global network (e.g., the Internet).

Figure 8:
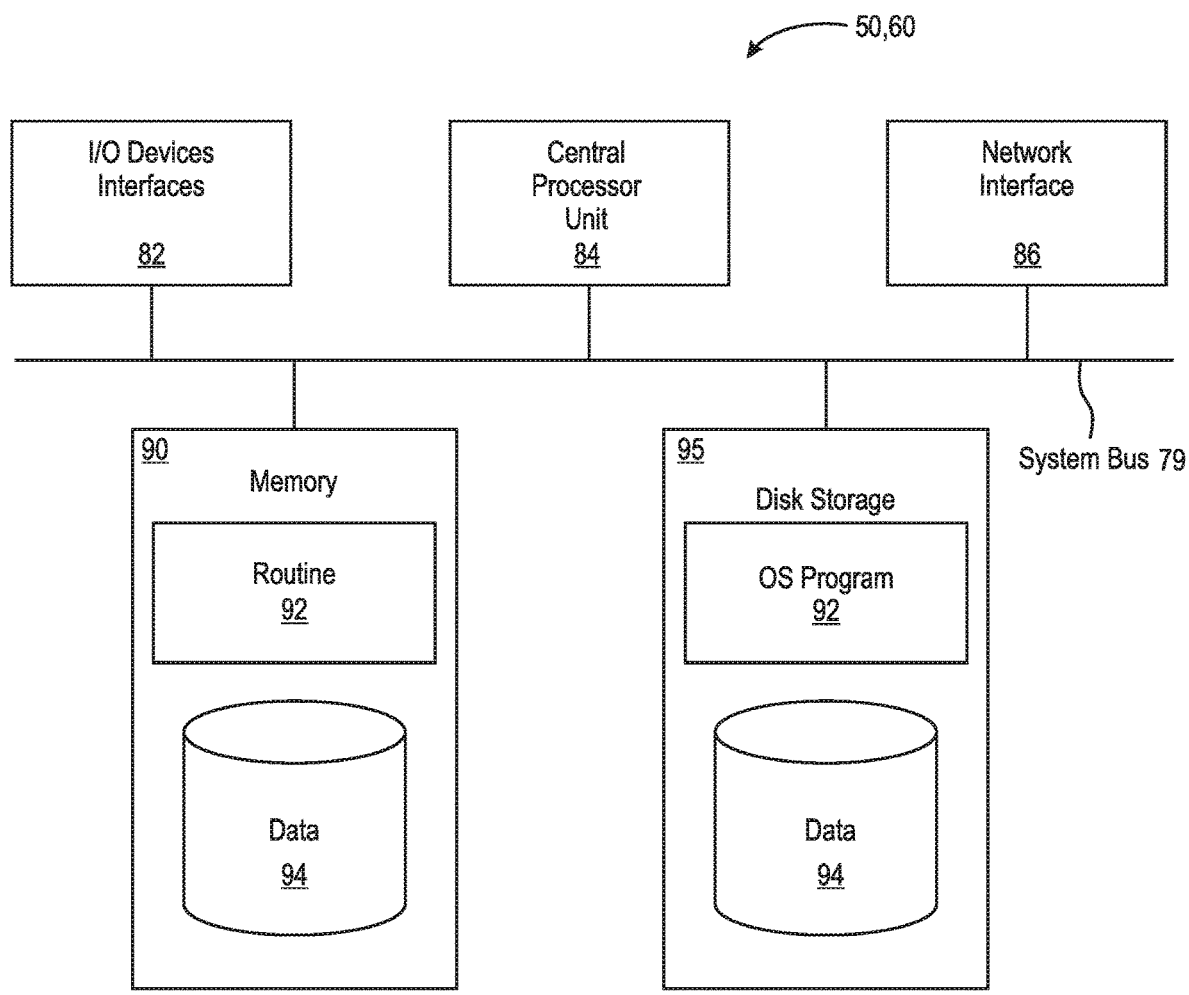
FIG. 8 is a block diagram illustrating an example computer node of the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 7). Memory 90 provides volatile storage for computer software instructions 92 and data 94 used to implement many embodiments (e.g., code detailed above and in FIGS. 2-6, including routines, 200, 300, 400, 500, and 600). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 75 (FIG. 7) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

What is claimed is:
1. A network comprising:
  a plurality of nodes, each node being assigned a network address based in three-dimensional hyperbolic space, the network address including:
    a first portion including an angular coordinate representing a latitude of a location of the node;
    a second portion including an angular coordinate representing a longitude of the location of the node; and
    a third portion including a radial coordinate representing a centrality of the location of the node; and the network address being determined by:
    determining the latitude and longitude of the location of the node;
    determining the centrality of the location of the node;
    generating the network address in three-dimensional hyperbolic space based on the angular coordinate representing the latitude, the angular coordinate representing the longitude, and the radial coordinate representing the centrality.

2. A network as in claim 1 wherein the network address of a node includes the latitude and longitude of the location of the node represented in radians.

3. A network as in claim 1 wherein the centrality of a node is determined based on a rank of a zone in which the node is located, the rank being based on values of a characteristic of a plurality of zones.

4. A network as in claim 3 wherein the characteristic of the plurality of zones is population density, and wherein the rank of the zone is based on a decreasing order of population density.

5. A network as in claim 1 wherein the centrality of a node is determined by:
    designating a plurality of regions in the network;
    designating a plurality of zones within each region;
    ranking at least a subset of zones within each region based on values of a characteristic of the plurality of zones; and
    determining the centrality for the node based on the rank of the zone within which the node is located.

6. A network as in claim 1 wherein a new node added to the network is connected to a plurality of nodes that are closest to the new node based on hyperbolic distances determined from the network addresses of the new node and the plurality of nodes.

7. A network as in claim 1 wherein routing a packet at a given node in the network to a destination node in the network includes forwarding the packet to a next node that is directly connected to the given node and that is closest in hyperbolic distance to the destination node based on the network addresses of the next node and the destination node.

8. A method of assigning a network address to a node in a network, the method comprising:
    determining a latitude and longitude of a location of the node;
    determining centrality of the location of the node;
    generating a network address based in three-dimensional hyperbolic space, the network address including an angular coordinate representing the latitude, an angular coordinate representing the longitude, and a radial coordinate representing the centrality; and
    assigning the network address to the node.

9. A method as in claim 8 wherein generating a network address includes generating a network address that includes the latitude and longitude of the location of the node represented in radians.

10. A method as in claim 8 wherein determining the centrality of the location of the node includes determining the centrality of the location of a node based on a rank of a zone in which the node is located, the rank being based on values of a characteristic of a plurality of zones.

11. A method as in claim 10 wherein the characteristic of the plurality of zones is population density, and wherein the rank of the zone is based on a decreasing order of population density.

12. A method as in claim 8 wherein determining the centrality of the location of the node includes determining the centrality of the location of a node by:
    designating a plurality of regions in the network;
    designating a plurality of zones within each region;
    ranking at least a subset of zones within each region based on values of a characteristic of the plurality of zones; and
    determining the centrality for the location of the node based on the rank of the zone within which the node is located.

13. A method as in claim 8 further comprising:
    adding a new node added to the network;
    assigning a network address to the new node;
    determining hyperbolic distances between the new node and the plurality of nodes based on the network addresses of the new node and the plurality of nodes; and
    connecting the new node to a plurality of nodes that are closest to the new node based on the determined hyperbolic distances.

14. A method as in claim 8 further comprising:
    receiving at a given node in the network a packet to be routed to a destination node in the network;
    determining hyperbolic distances between the destination node and a plurality of nodes directly connected to the given node, the hyperbolic distances being based on the network addresses of the destination node and the plurality of nodes; and
    forwarding the packet to a node of the plurality of nodes that is closest to the destination node based on the determined hyperbolic distances.

15. A non-transitory computer-readable data storage medium having computer-readable program codes embodied therein for assigning a network address to a node in a network, the computer-readable data storage medium program codes including instructions that, when executed by a processor, cause the processor to:
    determine a latitude and longitude of a location of the node;
    determine centrality of the location of the node;
    generate a network address based in three-dimensional hyperbolic space, the network address including an angular coordinate representing the latitude, an angular coordinate representing the longitude, and a radial coordinate representing the centrality; and
    assign the network address to the node.

16. A non-transitory computer-readable data storage medium as in claim 15 wherein the instructions cause the processor to determine the centrality of the location of a node based on a rank of the zone in which the node is located, the rank being based on values of a characteristic of a plurality of zones.

17. A non-transitory computer-readable data storage medium as in claim 16 wherein the characteristic of the plurality of zones is population density, and wherein the rank of the zone is based on a decreasing order of population density.

18. A non-transitory computer-readable data storage medium as in claim 15 wherein the instructions cause the processor to determine the centrality of the location of a node by:
    designating a plurality of regions in the network;
    designating a plurality of zones within each region;
    ranking at least a subset of zones within each region based on values of a characteristic of the plurality of zones; and
    determining the centrality for the location of the node based on the rank of the zone within which the node is located.

19. A non-transitory computer-readable data storage medium as in claim 15 wherein the instructions cause the processor, when adding a new node to the network, to:
- assign a network address to the new node;
- determine hyperbolic distances between the new node and the plurality of nodes based on the network addresses of the new node and the plurality of nodes; and
- connect the new node to a plurality of nodes that are closest to the new node based on the determined hyperbolic distances.

20. A non-transitory computer-readable data storage medium as in claim 15 wherein the instructions cause the processor, when routing a packet at a given node to a destination node in the network, to:
- determine hyperbolic distances between the destination node and a plurality of nodes directly connected to the given node, the hyperbolic distances being based on the network addresses of the destination node and the plurality of nodes; and
- forward the packet to a node of the plurality of nodes that is closest to the destination node based on the determined hyperbolic distances.

* * * * *

UNITED STATES PATENT AND TRADEMARK OFFICE
CERTIFICATE OF CORRECTION

PATENT NO. : 10,812,365 B2
APPLICATION NO. : 15/814795
DATED : October 20, 2020
INVENTOR(S) : Dmitri Krioukov and Ivan Voitalov It is certified that error appears in the above-identified patent and that said Letters Patent is hereby corrected as shown below:

In the Specification

In Column 1, Line 10, please add the following paragraph:

--GOVERNMENT SUPPORT
This invention was made with government support under Grant Number W911NF-17-1-0491 awarded by the U.S. Army Research Office and Grant Number 1442999 awarded by the National Science Foundation. The government has certain rights in the invention.--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*